Dec. 1, 1925.
R. D. KING
1,563,376
DOUGHNUT FORMER
Filed Feb. 1, 1922    2 Sheets-Sheet 1
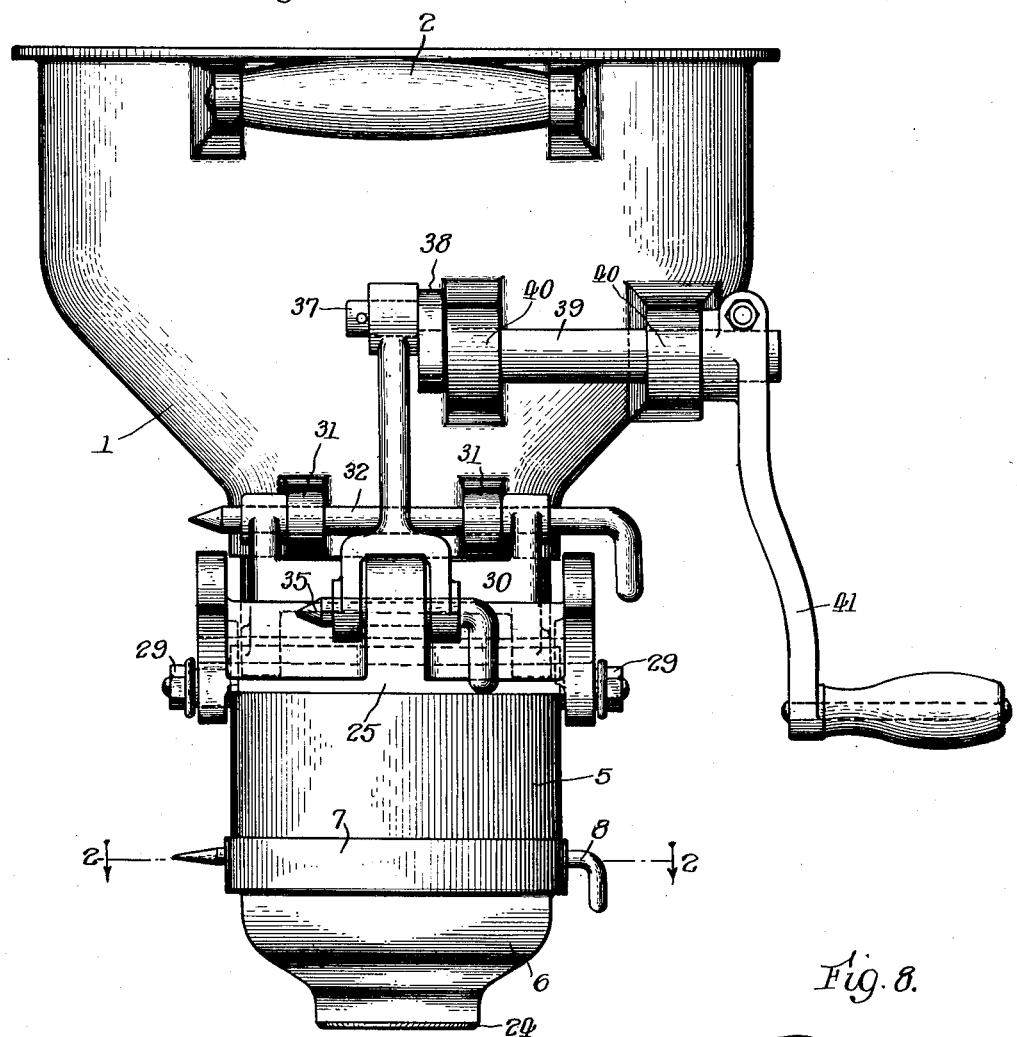
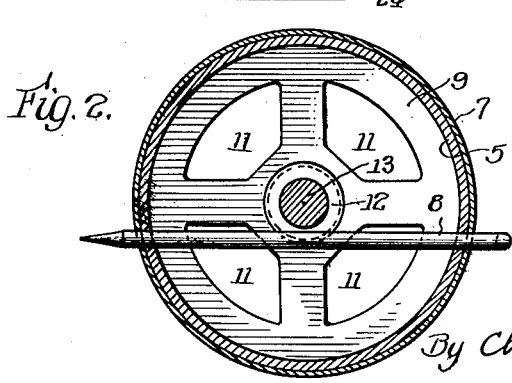
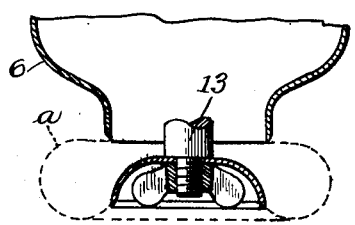
Inventor:
Roy D. King,
By Chindahl Parker & Carlson
Attys.

Dec. 1, 1925.
R. D. KING
DOUGHNUT FORMER
Filed Feb. 1, 1922
1,563,376
2 Sheets-Sheet 2
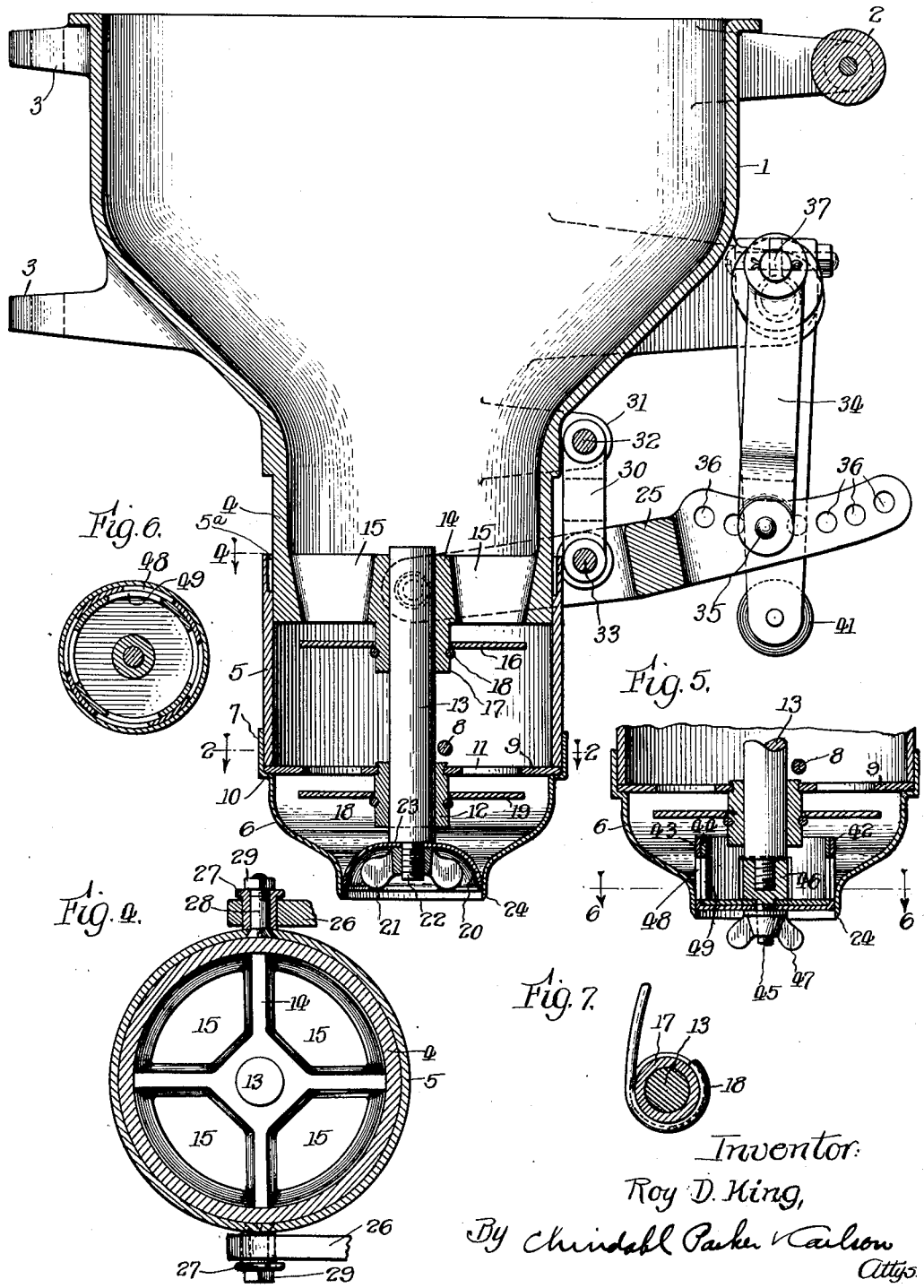

Patented Dec. 1, 1925.

1,563,376

UNITED STATES PATENT OFFICE.

ROY D. KING, OF CHICAGO, ILLINOIS; ANNA G. KING ADMINISTRATRIX OF SAID ROY D. KING, DECEASED.

DOUGHNUT FORMER.

Application filed February 1, 1922. Serial No. 533,220.

*To all whom it may concern:*

Be it known that I, ROY D. KING, a citizen of the United States, residing at Chicago, in the county of Cook and State of Illinois, have invented certain new and useful Improvements in Doughnut Formers, of which the following is a specification.

Prior doughnut formers have comprised mechanism which was susceptible of becoming clogged or inoperative through drying of the dough, thus necessitating disassembling of the machine for the purpose of cleaning the parts thereof. As heretofore constructed, doughnut formers have been relatively complicated and workmen of the character commonly employed to operate doughnut formers have experienced difficulty in taking the machine apart and reassembling it.

One of the important objects of the present invention is to produce a doughnut former of very simple construction which may be taken apart and reassembled in a very short time by a person unskilled in mechanical matters and without the use of tools of any kind.

Another object of the invention is to provide a doughnut former wherein the dough shall not be exposed to the air except at the top, thus obviating any danger of the machine being rendered inoperative through drying of the dough.

A further object is to provide a construction which shall eliminate any possibility of leakage or dripping of the dough when the machine is standing idle.

A further object is to attain ease of operation, this result being obtained by simplicity of construction and by locating the bearings where dough cannot get into them and cause friction.

Further objects are to obtain uniformity in the size and shape of the doughnuts, to provide means for quickly and easily adjusting the machine to form doughnuts of various sizes and shapes, to prevent the drawing of air into the dough and thus avoid the formation of bubbles in the doughnuts, and to produce a machine which will operate successfully with dough of any consistency.

In the accompanying drawings, Figure 1 is a front elevation of a doughnut former embodying the features of my invention. Fig. 2 is a horizontal sectional view taken in the plane of dotted lines 2—2 of Figs. 1 and 3. Fig. 3 is a vertical central sectional view of the doughnut former. Fig. 4 is a horizontal sectional view taken approximately in the plane of dotted line 4—4 of Fig. 3. Fig. 5 is a fragmental sectional view illustrating an alternative construction adapted to produce ball doughnuts and doughnuts of elongated form. Fig. 6 is a section on line 6—6 of Fig. 5. Fig. 7 illustrates a detachable clip or retainer for the valves to be hereinafter mentioned. Fig. 8 illustrates the operation of forming a doughnut of ring form.

While the present invention may be embodied in various forms, it is herein shown as comprising a hopper 1 having a handle 2 at its forward side and perforated lugs 3 at its rear side. By means of the lugs 3 the hopper may be connected to a jointed arm or the like for movably supporting the doughnut former over a kettle of hot fat. The lower end of the hopper 1 communicates with dough-feeding means and doughnut-forming means. In the present embodiment, the lower end of the hopper 1 is constricted to form a cylindrical vertically-disposed outlet 4 (Fig. 3) upon which is sleeve or cylinder 5 is vertically reciprocable. To prevent leakage of air between the parts 4 and 5, the upper end of the cylinder 5 may, if desired, be counterbored to produce an annular space 5ª to contain a quantity of liquid of the same kind as that in which the doughnuts are fried.

To the lower end of the cylinder 5 is connected an annular shell 6, the parts 5 and 6 being preferably connected in such a manner that they may be readily separated and reassembled. Herein the shell 6 is shown as having at its upper end an annular flange 7 which surrounds the lower end of the cylinder 5, a retaining pin 8 being passed through openings in said flange and cylinder. A spider 9 is held in place between the lower end of the cylinder 5 and a shoulder 10 on the shell 6, the spider 9 being formed of sheet metal and providing opening or ports 11 (Fig. 2). To the central portion of the spider 9 is secured a collar 12 which is slidable upon a post or stem 13 extending axially of the hopper and secured at its upper end in a spider 14 at the lower end of the outlet 4. The spider 14 provides openings or ports 15 (Figs. 3 and 4).

A check-valve 16 in disk form is mounted for vertical sliding movement upon a hub or sleeve 17 extending downwardly from the spider 14, said hub encircling the stem 13. The valve 16 is reciprocable into and out of contact with the lower side of the spider 14 and is of sufficient diameter to close the lower ends of the ports 15. The valve disk 16 is removably retained upon the hub 17 by suitable means, as, for example, a spring clip 18 (Figs. 3 and 7) fitting within a peripheral groove in the head 17.

A similar check-valve disk 19 is mounted for vertical reciprocation upon the sleeve 12. Said valve disk is adapted to close the ports 11 and is removably held in place by means of a clip 18 or other suitable means.

To the lower end of the stem 13 is removably secured a circular die or severing element 20 having the general form of an inverted cup. The die 20 is held in place by a wing nut 21 which is turned upon the reduced screw threaded lower end 22 of the stem 13, said nut holding the die between itself and the shoulder 23 on the stem 13. The external diameter of the die 20 is such that the die fits snugly within the contracted lower end of the shell 6, the lower end of said shell being beveled so as to form an annular knife or forming element 24.

While any suitable means may be employed to reciprocate the cylinder 5 and the shell 6, herein is shown a lever 25 one end of which is forked to provide two arms 26 extending at opposite sides of the cylinder 5. The ends of the arms 26 are perforated to receive bushings 27 which are mounted on studs 28 fixed to and projecting outwardly from diametrically-opposite points upon the upper portion of the cylinder 5. The bushings 27 are retained in place by means of nuts 29.

The lever 25 is supported intermediate its ends by means of a link 30, said link being pivotally connected to lugs 31 on the exterior of the hopper 1 by means of a withdrawable pin 32. The lower end of the link 30 is pivoted to the lever 25 at 33. The forward end of the lever 25 is adjustably connected to the forked lower end of a connecting rod 34 by a withdrawable pin 35, said pin being adapted to pass through any one of a series of openings 36 in the lever 25. The upper end of the connecting rod 34 is pivoted upon a wrist pin 37 on a crank disk 38, said disk being rigid with a shaft 39 which is mounted in bearings 40 on the exterior of the hopper 1. To one end of the shaft 39 is fixed a crank 41.

In operation, a quantity of dough is placed in the hopper 1, the dough flowing through the ports 15, past the check-valve 16 and into the cylinder 5, and thence through the ports 11 and past the check valve 19 into the interior of the shell 6. When the crank 41 is rotated the cylinder 5 is first raised, the contents of the cylinder 5 carrying the check valve 16 up into contact with the spider 14. As the cylinder 5 continues to rise, some of the contents of said cylinder are forced out through the ports 11 and into the shell 6, thus causing some of the contents of said shell to be extruded in the form of an annular fringe of dough $a$ (Fig. 8) encircling the stationary forming element 20. When the cylinder 5 descends, the check valve 19 is forced against the spider 9, and the annular cutting edge 24 of the shell 6 severs the before-mentioned annular fringe of dough from the body of dough contained in the shell 6, the ring of dough thus formed dropping into the kettle of hot fat above which the doughnut former is positioned.

As the cylinder 5 descends, dough flows from the hopper 1 through the ports 15 and past the check valve 16 to prevent the formation of a vacuum in the cylinder 5.

It will be seen that when the cylinder 5 rises, dough will be positively extruded through the annular space between the stationary forming element 20 and the circular cutting element 24, and that when the cylinder 5 descends the extruded material is severed from the source of supply.

It will be evident that the construction just described constitutes a pump having a stationary valved head or piston 14, a reciprocating cylinder 5, a valved head 9 fixed to the cylinder, and an outlet 24 also fixed to the cylinder; and that in coaction of the outlet 24 and the stationary element 20 rings of dough are successively formed.

In order that ball doughnuts and elongated doughnuts may be formed, I have provided a forming element 42 (Fig. 5) adapted for cooperation with the forming element 24, the forming element 42 consisting of two cup-like members 43 and 44 in nested relation. The bottoms of the cups 43 and 44 are perforated to fit upon the reduced lower end 45 of a stud 46, said stud having a screw-threaded socket to receive the threaded end 22 of the stem 13. A wing nut 47 on the stud 45 secures the cups 43 and 44 removably in place. The cups 43 and 44 have vertical peripheral walls, the cup 43 being of such diameter as to fit snugly within the lower end 24 of the shell 6. In the peripheral walls of the cups 43 and 44 are formed openings 48 and 49, respectively, as shown in Figs. 5 and 6. It will be apparent that by rotating the cups 43 and 44 relatively to each other, so as to place said openings more or less in register with each other, the effective size of the openings through which dough may be extruded may be varied as desired. In the reciprocation of the pump cylinder 5 and the shell 6, dough will be extruded from the openings in the forming element 42 as the cylinder and shell ascend, and the extruded masses of dough will be cut off as the cylinder and shell descend. In the construction shown in Figs. 5 and 6, four lumps of dough will be simultaneously formed in each reciprocation. The openings in the forming element 42 may be adjusted to such a horizontal width and the stroke of the cylinder and the shell may be adjusted to such an extent, that the lumps of dough will produce substantially globular doughnuts; or the openings in the forming element 42 may be further restricted and the length of stroke of the cylinder and shell so adjusted that elongated masses of dough will be extruded and cut off to form elongated doughnuts.

When it is desired to take the machine apart for cleaning, the wing nut 21 is unscrewed, whereupon the forming element 20 may be removed; the pin 8 is pulled out, whereupon the shell 6 and the head 9 may be separated from the cylinder 5; the check valve 19 may be removed by disengaging the clip 18; the cylinder 5 may be removed from the hopper by pulling out the pins 32 and 35; and the check valve 16 may be removed by releasing its retainer 18. All of the interior surfaces are then readily accessible for cleaning. It will be seen that the machine may be taken apart and reassembled very rapidly and easily without the use of any tools.

The machine may be quickly adjusted to form doughnuts of the desired size by shifting the pin 35 from one hole 36 to another.

It will be seen that for any given adjustment of the pin 35 an invariable amount of dough will be extruded from the cylinder 5 and the shell 6 in each reciprocation, thus effecting uniformity in the size of the doughnuts.

The machine will operate successfully with dough of any consistency, inasmuch as a predetermined amount of dough is drawn from the hopper 1 for each doughnut.

When the machine is left standing in the position shown in Fig. 3, there will be no leakage of dough, since there is a snug fit between the parts 20 and 24.

Inasmuch as the dough is not exposed to the air except at the top, no drying will occur which can interfere with the operation of the mechanism.

There being no bearings through which air can be drawn into the dough, the doughnuts formed will be free from bubbles.

While the present embodiment of the invention has been described with considerable particularity, this has been done for the purpose of imparting a clear understanding of one form of the invention and not for the purpose of limiting or defining its scope. Various changes may obviously be made in the construction, arrangement and movements of the several parts without departing from the invention defined in the appended claims.

I claim as my invention:

1. A doughnut former having, in combination, a reciprocatory cylinder, a stationary valved head for one end of the cylinder, a ported head fixed to the other end of the cylinder, a check valve for the second head, a stem fixed to the stationary head and extending axially of the cylinder and through the second head, an annular forming element fixed to the outer end of the stem, a shell fixed to the last mentioned end of the cylinder, said shell having an outlet adapted to snugly surround the annular forming element, and means to reciprocate the cylinder and shell to carry the latter into and out of engagement with the stationary forming element.

2. A doughnut former having, in combination a hopper having a reduced lower end provided with an outlet, a check valve for the outlet, a cylinder slidably mounted on the lower end of the hopper for reciprocation axially of the hopper, a ported head for the lower end of the cylinder, a check valve for the head, a stationary forming element secured to the hopper, and a coacting forming element secured to the lower end of the cylinder.

3. A doughnut former having, in combination, a hopper, a dough-feeding element slidably mounted on the lower end of the hopper for movement axially of the hopper, coacting forming elements on the hopper and the feeding element, a lever connected at one end to the feeding element and intermediate its ends to the hopper, and a crank supported on the hopper and connected to the other arm of said lever for oscillating the latter.

4. A doughnut former having, in combination, a hopper, means to feed dough from the hopper, a lever connected at one end to the feeding means and intermediate its ends to the hopper, and a crank supported on the hopper and adjustably connected to the other arm of said lever for oscillating the latter.

5. A doughnut former having, in combination, a hopper, a dough-feeding element slidably mounted on the lower end of the hopper for movement axially of the hopper, coacting forming elements on the hopper and the feeding element, and means to slide the dough-feeding element toward and away from the forming element on the hopper.

6. A doughnut former having, in combination, a stationary forming element and a dough pump having a reciprocable outlet, said outlet when at one end of its stroke providing an annular space between itself and the stationary forming element, and when at the opposite end of its stroke snugly surrounding said stationary element, said outlet being positively operated by the operation of the pump.

7. A doughnut former having, in combination, a stationary forming element and a dough pump carrying an outlet reciprocable toward and away from the stationary forming element, said outlet providing a space for the extension of dough when at one end of its stroke, and serving to close said space when at the opposite end of its stroke.

8. A doughnut former having, in combination, a dough pump comprising a stationary valve head, a reciprocatory cylinder, a head fixed to the cylinder and having a valved outlet, a dough severing element stationarily supported axially of the cylinder, and a coacting annular severing element secured to the cylinder concentric with the first-mentioned severing element.

9. A doughnut former having, in combination, a dough pump comprising a stationary valved head, a reciprocatory cylinder, a head fixed to the cylinder and having a valved outlet, a stationary severing element, and a coacting severing element fixed to the cylinder.

10. A doughnut former having, in combination, a dough pump comprising a stationary valved head, a reciprocatory cylinder, a head fixed to the cylinder and having a valved outlet, and means to sever the dough extruded from said outlet.

11. A doughnut former having, in combination, a cylinder, a valved head for one end of the cylinder, a valved piston in the cylinder, a stem fixed to the piston and extending axially of the cylinder and through the head, a forming element fixed to the outer end of the stem, a coacting annular forming element fixed to said end of the cylinder, and means to cause relative reciprocation between the cylinder and the piston.

12. A doughnut former having, in combination, a dough pump comprising a cylinder having a valved head, a valved piston, two coacting forming elements fixed respectively to the cylinder and the piston, means to cause relative movement between the piston and the cylinder, and means to adjust the length of such movement.

13. A doughnut former having, in combination, a dough pump comprising a cylinder having a valved head, a valved piston, and two coacting forming elements fixed respectively to the cylinder and the piston.

14. A doughnut former having, in combination, a valved piston, a cylinder with fixed head having a valved outlet, means for reciprocating the valved piston and the cylinder in respect to each other, and means for severing the dough extruded from said outlet.

15. A doughnut former having, in combination, a forming element comprising two nested relatively rotatable cups having openings adapted to register, means for forcing dough through said openings, and an annular knife surrounding said forming element and reciprocable axially thereof to sever dough extruded through said opening.

In testimony whereof, I have hereunto affixed my signature.

ROY D. KING.